United States Patent
Zimmerman (10) Patent No.: US 6,745,040 B2
(45) Date of Patent: Jun. 1, 2004

(54) METHOD AND SYSTEM FOR PROCESSING INCOMING CALLS ON A COMMUNICATION UNIT

(75) Inventor: John Zimmerman, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 463 days.

(21) Appl. No.: 09/891,039

(22) Filed: Jun. 25, 2001

(65) Prior Publication Data

US 2002/0198007 A1 Dec. 26, 2002

(51) Int. Cl.[7] ................................................. H04Q 7/20
(52) U.S. Cl. ..................... 455/458; 455/414.1; 455/567
(58) Field of Search ............................. 455/415, 566, 455/550.1, 567, 414.1, 458, 459

(56) References Cited

U.S. PATENT DOCUMENTS

| | | | |
|---|---|---|---|
| 5,020,091 A | 5/1991 | Krolopp et al. ............... 379/58 |
| 5,220,599 A | 6/1993 | Sasano et al. ............... 379/142 |
| 5,371,781 A | 12/1994 | Ardon ........................ 379/59 |
| 5,437,053 A | 7/1995 | Sawa et al. ................. 455/33.1 |
| 5,448,622 A * | 9/1995 | Huttunen .................... 455/551 |
| 5,655,015 A | 8/1997 | Walsh et al. ................ 379/201 |
| 5,715,308 A | 2/1998 | Shankarappa ............... 379/373 |
| 5,764,730 A | 6/1998 | Rabe et al. .................... 379/58 |
| 6,018,654 A | 1/2000 | Valentine et al. ........... 455/414 |
| 6,041,103 A | 3/2000 | La Porta et al. ........... 379/67.1 |
| 6,208,854 B1 | 3/2001 | Roberts et al. ............. 455/417 |
| 6,222,921 B1 | 4/2001 | Mugura et al. ............. 379/354 |
| 6,606,508 B2 * | 8/2003 | Becker et al. .............. 455/567 |

FOREIGN PATENT DOCUMENTS

| | | |
|---|---|---|
| EP | 0982913 A2 | 3/2000 |
| EP | 0982959 A2 | 3/2000 |

* cited by examiner

*Primary Examiner*—Cong Van Tran
(74) *Attorney, Agent, or Firm*—Gregory L. Thorne (57) ABSTRACT

A method is provided for a wireless message receiving apparatus to selectively and independently respond to received messages having multiple directory numbers associated therewith. Each directory number associated with the wireless communication unit is considered to be associated with one of a plurality of user personas or identities. For example, a first directory number may be associated with a "worker" identity, a second directory number may be associated with a "homemaker" identity" and so on. When a caller dials one of the directory numbers, the caller is considered to be accessing the associated user persona. The communication unit, upon receiving a call, responsively identifies the persona that is being accessed and independently responds in accordance with a pre-stored general disposition instruction.

13 Claims, 8 Drawing Sheets

| - EXCEPTION NUMBERS FOR WORK PERSONA - | |
|---|---|
| TOM | 222 - 444 - 4444 |
| LALITHA | 222 - 444 - 4545 |
| BOSS | 222 - 444 - 4555 |

FIG. 5C

| - EXCEPTION DATA FOR CALLER TOM - | |
|---|---|
| - EXCEPTION DISPOSITION - INSTRUCTION | - EXPIRATION DATE - ANYTIME |
| "RING TONE: BORN IN THE USA" | 6 - 7 - 2001 4:30 P.M. |
| "RING TONE: HAVING MY BABY" | |
| FORWARD TO HOME VOICE MAIL | |

METHOD AND SYSTEM FOR PROCESSING INCOMING CALLS ON A COMMUNICATION UNIT

TECHNICAL FIELD

The present invention relates in general to telecommunication methods and apparatus, and more particularly relates to a method for providing message processing in a communication unit over a wireless network.

RELATED BACKGROUND ART

Communications between individuals have become an important and extensive part of contemporary society. As a result, technology has proliferated in order to produce numerous ways for individuals to communicate with one another. This proliferation of new modes of communication is manifest, for example, in the use of text based communication techniques, such as e-mail, and wireless personal communication devices such as pagers, wireless communication units, and cordless telephones.

While these and similar devices provide numerous advantages and conveniences heretofore unrealized, they are not without drawbacks. One such drawback associated with these devices is that they make the users of such devices more available than ever before. This can prove to be disconcerting to even the most enthusiastic embracers of the technology.

Throughout the course of an average day, people normally assume a number of roles or identities (e.g., employee, homemaker, coach, or boy/girl scout leader). However, the problem is that while the person is assuming a particular role or identity, he or she receives messages (e.g., calls, pages, emails) from any number of individuals for any number of purposes. This can prove to be burdensome for the person to have to actively participate in the discrimination of the received calls as they occur. For example, receiving non-work related calls while trying to perform the duties of a job can be unproductive or even job threatening. Similarly, receiving work related calls while at home can prove to be equally disconcerting. Unfortunately, there is no way at present for discriminating between incoming messages without active user participation.

It would therefore be desirable to provide a communication unit, such as a personal message receiving device, which can selectively and independently respond to the reception of messages in accordance with the different identities or roles assumed by a user of such a device as messages are received throughout the day.

SUMMARY OF THE INVENTION

There is provided a method for selectively and independently responding to received messages in a wireless communication unit having multiple directory numbers associated therewith. A directory number may be, for example, a telephone number that a caller dials to reach the wireless communication unit. A number of directory numbers may be associated with a single wireless communication unit. Where the wireless communication unit is a cellular phone, the cellular phone may receive incoming calls for two or more dialed numbers, for example, by associating the cellular phone ID with each dialed number in the MSC. Each such dialed number is thus a directory number for the wireless communication unit.

Each directory number associated with the wireless communication unit is considered to be associated with one of a plurality of user personas or identities. For example, a first directory number may be associated with a "work" identity, a second directory number may be associated with a "homemaker" identity and so on. When a caller dials one of the directory numbers, the caller effectively accesses the associated user persona. In accordance with the method, the communication unit, upon receiving a call, automatically identifies the persona that is being accessed and automatically responds in accordance with a pre-stored disposition instruction.

At a pre-configuration stage, the method generally includes the steps of pre-storing in a communication unit a general call disposition instruction for each of a plurality of directory numbers. In addition, an exception list for each directory number is pre-stored comprised of one or more exception phone numbers, corresponding to particular calling parties, as well as an associated exception disposition instruction for each exception phone number and an associated expiration date and time. The exception list is used to respond to those callers for whom the user wishes to respond in a different manner than specified by the general disposition instruction.

At an operational stage, upon receiving an incoming call, the particular directory number that is dialed by a caller is automatically identified. The calling number from which the call is placed, which is obtainable from the caller ID data, is compared with the one or more stored exception phone numbers associated with the identified directory number. When a match is found between the calling number and a stored exception number, the call is handled in accordance with the exception disposition instruction corresponding to the exception number stored in the exception list. If a match is not found, the incoming call is handled in accordance with the general disposition instruction for the identified directory number.

An apparatus for carrying out each of the above method steps is preferably integrated into a standard communication unit, such as a mobile phone, pager or PDA device. Alternatively, the apparatus could be integrated into a personal computer having communication (e.g., email) capabilities. The plurality of directory numbers and associated general disposition instructions are stored in a memory. In addition, the memory stores for the disposition numbers an exception list consisting of data fields representative of one or more exception phone numbers each having an associated exception disposition instruction and expiration date. The memory is accessible by the user for purposes of updating, deleting or adding both the general disposition instructions and the exception list data.

The apparatus further includes electronic processing that compares the calling number of an incoming call with the exception list phone numbers stored for the directory number dialed. The incoming call is handled in accordance with the general disposition instruction or, if there is a match with an exception number on the exception list, the exception disposition instruction.

According to one aspect of the present invention, the receiving apparatus stores a distinctive ring, melody or tone for each directory number associated with the receiving apparatus. Whenever the general disposition instruction indicates that the incoming call should be completed, the distinctive melody for the particular directory number dialed is played.

The method and system of the present invention may be used in conjunction with any existing or future communication network in which messaging is conducted. Such networks may include, for example, wireless networks such as a Global System for Mobile Communication (GSM) Public Land Mobile Network (PLMN).

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAILED DESCRIPTION OF THE PREFERRED EMBODIMENTS

A preferred embodiment of the present invention applied in a mobile telephone will be described with reference to the accompanying drawings.

Figure 1:
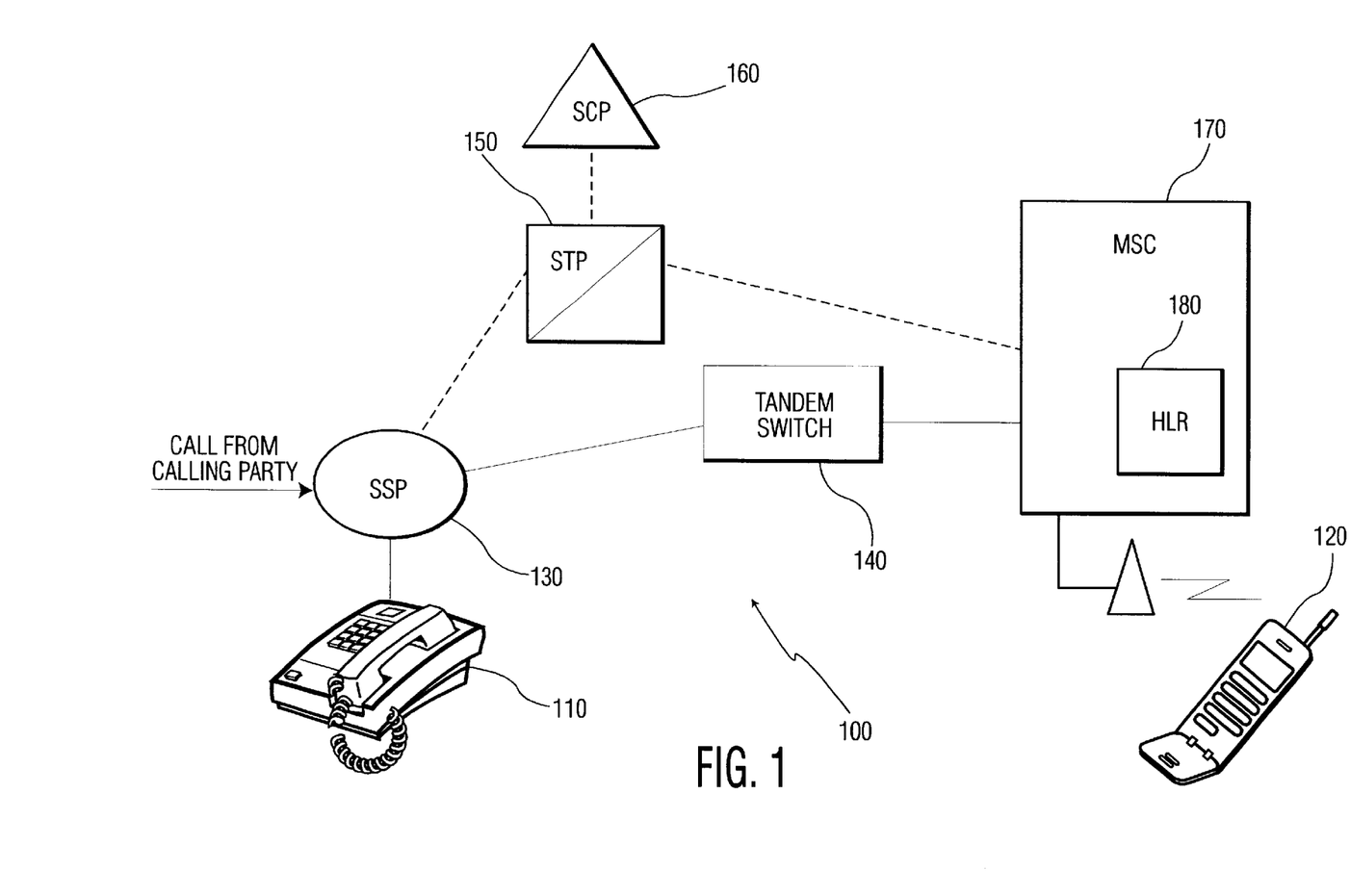
FIG. 1 is a block diagram illustrating a wireless mobile communication system in which the present invention may be practiced.

Referring now to the drawings in greater detail, FIG. 1 illustrates a simplified block diagram of a wireless telecommunication system 100 in which the present invention may be used. The description will first focus on a particular example where landline communication unit 110 makes a call to a wireless communication unit 120 which is a cellular telephone, but may also be a personal communication device or any digital or analog wireless communication device such as a PDA, or a pager. Cell phone 120 (or each like device) has multiple directory numbers associated with it. As previously described in the case of a cell phone, multiple directory numbers implies that cell phone 120 has assigned multiple telephone numbers. Calling any one of the assigned multiple telephone numbers (i.e., directory numbers), for example, from unit 110, reaches cell phone 120.

Landline communication unit 110 is coupled with wireless communication unit 120 through a signal switching point (SSP) 130, a tandem switch 140, a signal transfer point (STP) 150, a service control point (SCP) 160, a mobile switching center (MSC) 170, and a home location register (HLR) 180. This system 100 embodies an intelligent bridge between components used in wireless and landline networks. The MSC 170 and the HLR 180 are components used in a wireless network. The MSC 170 handles switching and routing to the wireless communication unit 120, and the HLR 180 is a database that stores information about the location of the wireless communication unit 120. Because the operations of these components of system 100 are generally known in the art, they will only be further explained to the extent necessary to provide context in which the present invention may be applied.

Figure 2:
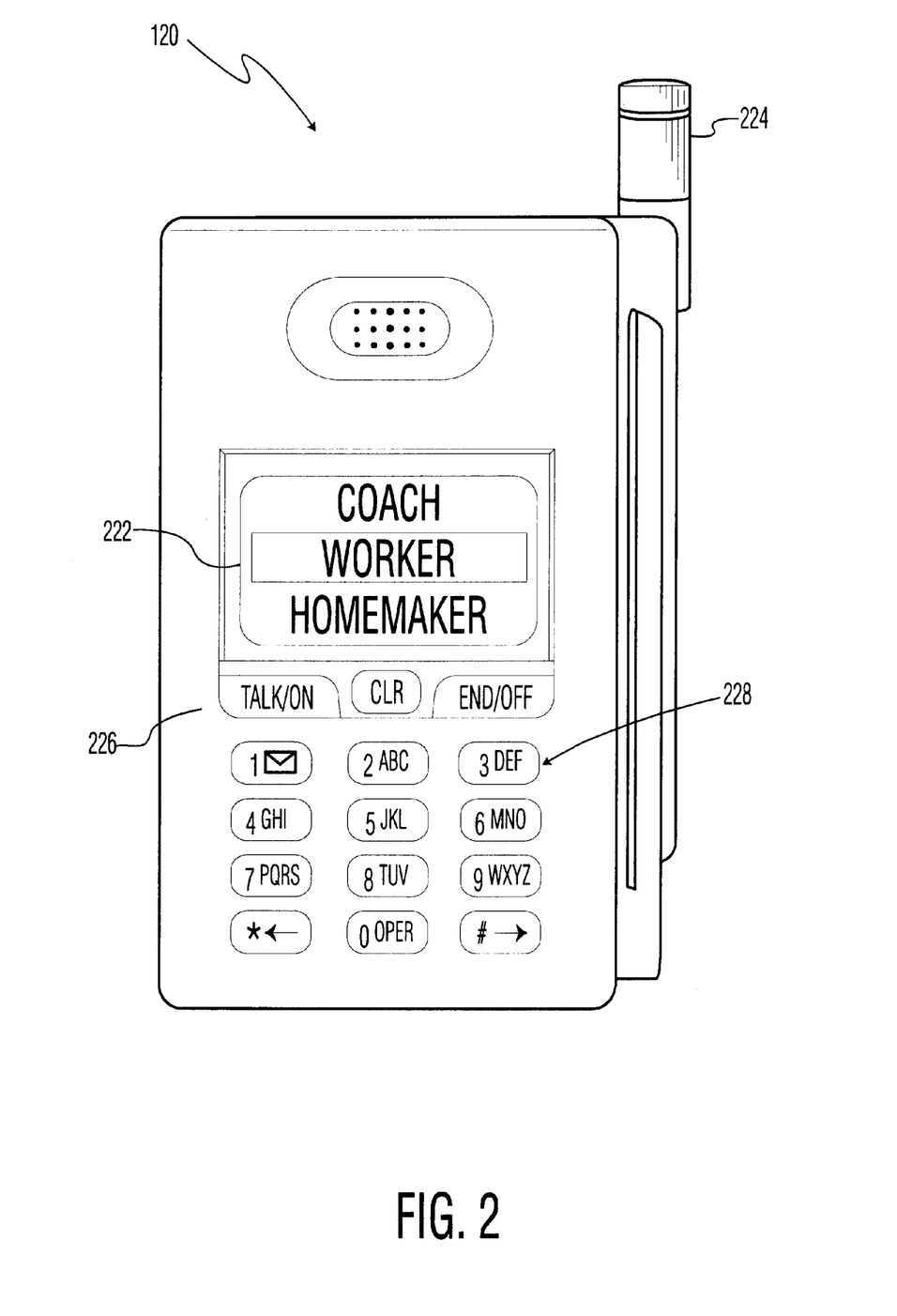
FIG. 2 is a front view of a cellular telephone, which can be used to implement the present invention.

Referring to FIG. 2, there is shown the front view of a cellular telephone 120, which can be used to implement a first embodiment of the present invention. As shown in FIG. 2, the cellular telephone 120 includes a display screen 222, an antenna 224, and a control panel 226. The control panel 226 includes a key panel 228 including twelve alpha/numeric keys. Keys are provided for displaying the menu items displayed on the display screen 222 (i.e., scrolled up and down) and for selecting a menu item displayed on the display screen.

Figure 3:
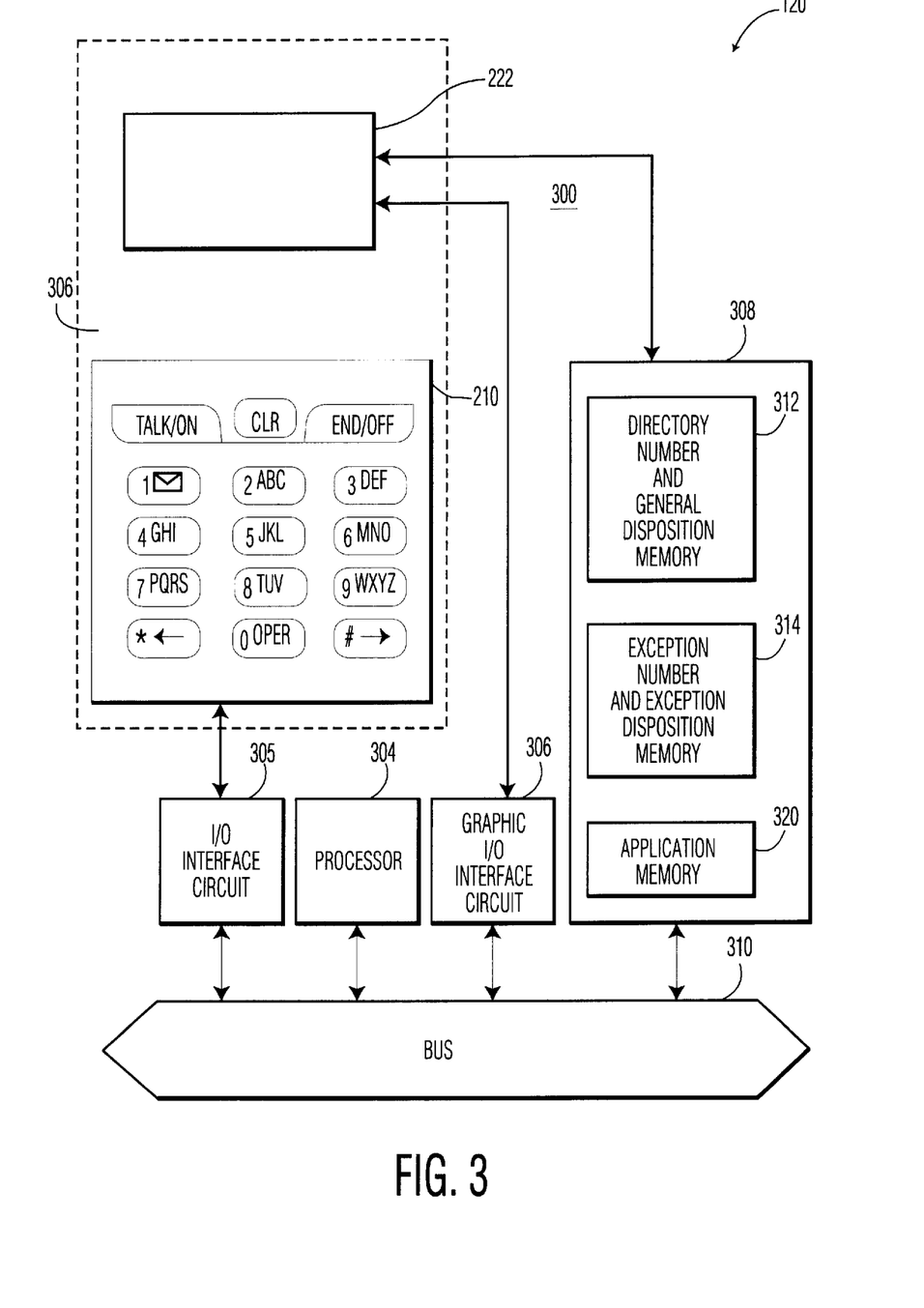
FIG. 3 is a block diagram illustrating a number of components of the cellular telephone shown in FIG. 2 and which support a first embodiment of the present invention.

Referring to FIG. 3, there is shown a block diagram 300, illustrating components of the cellular telephone 120 shown in FIG. 2, in accordance with one embodiment of the present invention. As shown in FIG. 3, the block diagram 300 includes a processor 304, an I/O (input and output) interface circuit 305, a graphic I/O interface circuit 306, a memory 308, and a bus 310. The processor 304, the I/O interface circuit 305, the graphic I/O interface circuit 306, and the memory 308 are all coupled to the bus 310.

The memory unit 308 generally include both volatile or nonvolatile components. Volatile memory includes random access memory (RAM). According to the preferred embodiment, the memory unit 308 is a RAM. Nonvolatile memory may include electrically erasable programmable read only memory (EEPROM), a Flash erasable programmable read only memory (Flash-EPROM) and a read only memory (ROM).

The memory 308 includes: (1) a directory number and general disposition memory 312 for storing a plurality of user personas, a directory number associated with each user persona and an associated disposition instruction for each persona, (2) an exception number and exception disposition memory 314 for storing one or more exception phone numbers, an associated exception disposition instruction for each exception phone number and (optionally) an associated expiration date and time (3) an application memory 320 for storing applications that includes a data entry routine, and a display routine.

The processor 304 controls the operations of the I/O interface circuit 305, the graphic I/O interface circuit 306, the memory 308, and the display region 222. More specifically, the processor 304 may: (1) access data stored in the directory number and general disposition memory 312, the exception number and exception disposition memory 314, (2) execute the applications stored in the application memory 320, (3) interact with the control panel 226 via the I/O interface circuit 305, and (4) display the data stored in output buffers (not shown) for memories 312 and 314 on the display region 222 via the graphic I/O interface circuit 306. All these operations are performed in a conventional manner, except as otherwise described herein.

A user can invoke a conventional data entry routine (stored in the application memory 320) and use the nine alpha/numeric keys on the key panel 228 to input disposition instructions for the directory numbers to the directory number and general disposition memory 312. The user may also input exception telephone numbers with associated exception disposition instructions, and associated dates and times where applicable, to the exception number and exception disposition memory 314. Examples of such input are described with respect to FIGS. 5A–5D below.

Figure 4A:
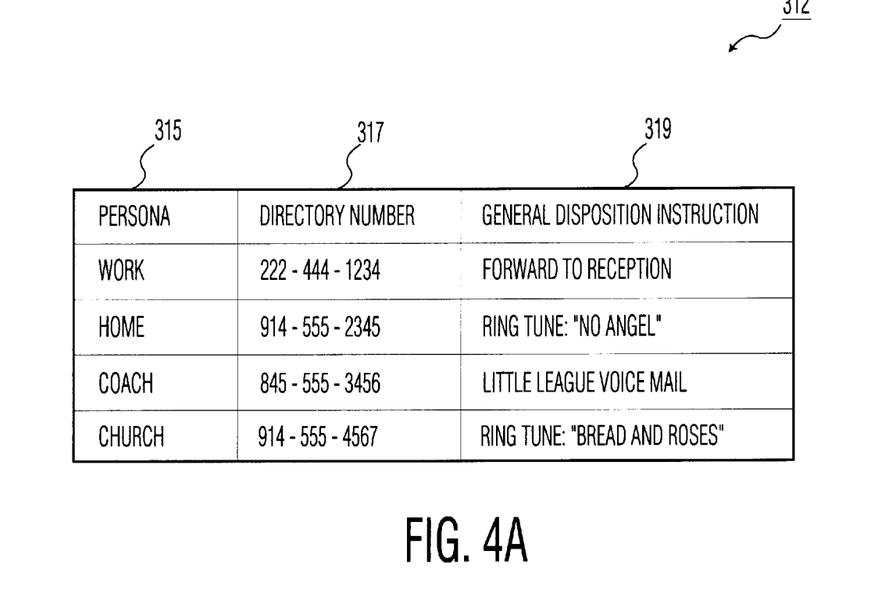
FIGS. 4A and 4B illustrate a sequence of displays on a display region, in accordance with the first embodiment of the present invention.

Referring to FIG. 4A, there is shown an exemplary representation of data stored in the directory number and general disposition memory 312. As shown in FIG. 4A, each row comprises three data fields where each row provides, at a first column, a user persona 315, at a second column, a directory number 317 associated with the user persona 315 and at a third column, a general disposition instruction 319. As seen, row 1 pertains to data for the users "work" persona. The directory number associated with the "work" persona is "222-444-1234" and the general disposition instruction for the "work" persona is "forward to reception". Therefore, when a caller dials the "work" directory number 222-444-1234 for the user, the processor 304 will generally execute the general call disposition instruction, "forwarded to reception" and forward the call to reception, assuming the processor 304 does not find the calling number (of the caller) on the exception list (to be described below).

In the case where a general disposition instruction is required to be entered or updated, or a directory number is added or deleted, the persona (e.g., work) may be displayed to the user to more easily identify the operation(s) to be performed.

Figure 4B:
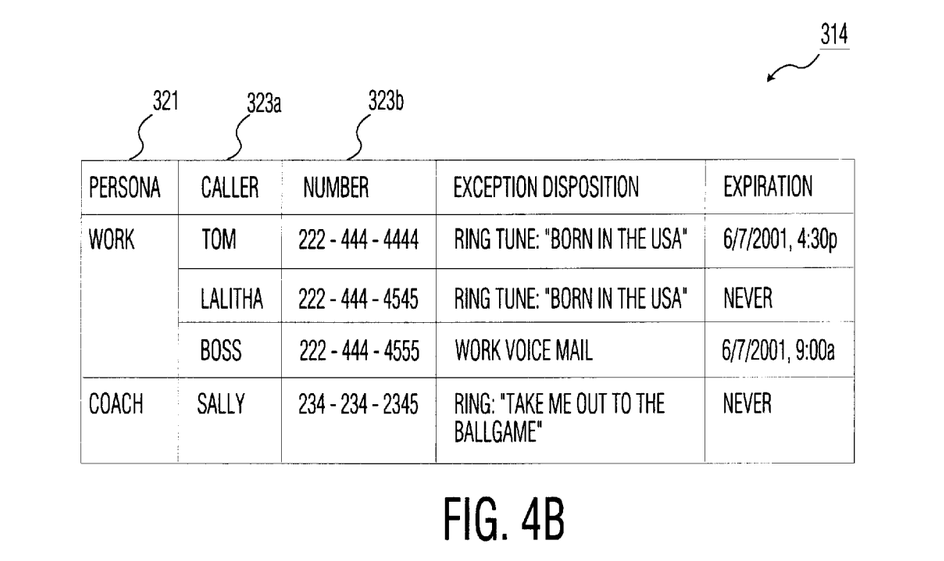

Referring now to FIG. 4B, there is shown an exemplary representation of data stored in the exception number and exception disposition memory 314. This includes an exception list for those callers for whom the user wants to handle in a different manner from that specified by the general disposition instruction.

As shown in FIG. 4B, the exception table 314 is organized by rows, first according to the user's persona 321 and, second, according to the caller 323a (or equivalently the calling number 323b of the caller shown in FIG. 4B as the "Exception Number"). Referring to the first grouping of rows of the table data, the "work" persona is shown. For this persona, the user has specified three exception numbers for which exception instructions apply, i.e., 222-444-4444, 222-444-4545 and 222-444-4555. For each exception number an exception disposition and expiration date is specified.

As described above with respect to FIG. 4A, in general, when a directory number is dialed by a caller, the applicable general disposition instruction is performed by the receiving unit. However, for those associated calling numbers listed as exception numbers, for a directory number, the general disposition instruction is not performed. Instead, the applicable exception disposition instruction is performed.

An example of how the exception table 314 is used will be described with reference to FIGS. 4A and 4B. Under ordinary circumstances, when the "work" directory number (defined in the present example as being associated with directory dialing number 222-444-1234) is dialed by a caller, the associated general disposition instruction, "forward to reception" is retrieved by processor 304 from directory number and general disposition memory 312 and performed by processor 304. However, before executing the general disposition instruction, the processor 304 determines the caller number from the caller ID and checks the applicable exception records, as shown in FIG. 4B. In those circumstances where the caller is calling from a calling number that matches an exception number included in the exception list associated with the "work" persona, the applicable exception disposition instruction is performed in place of the general disposition instruction.

Thus, for example, if the call is made from 222-444-4444 to the "work" persona number 222-444-1234, FIG. 4B (row 1) shows that a match will occur with one of the stored exception numbers (e.g., calling number 222-444-4444). Thus, the exception disposition instruction "Ring Tune: Born in the USA" will be performed instead of performing the general disposition instruction "forward to reception" shown in row 1 of FIG. 4A. Additionally, the exception table 314 of FIG. 4B further includes an expiration date which is checked to determine if the exception disposition is still current. The exception disposition instruction will only be performed if it is a current disposition instruction.

The process of updating, adding or deleting the data elements referred to above with regard to FIGS. 4A and 4B are now described with reference to FIGS. 5A through 5D.

Figure 5A:
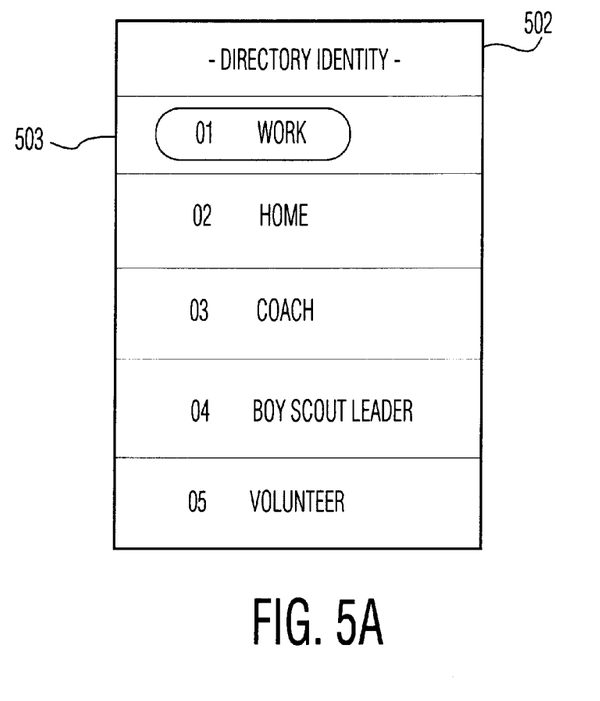
FIGS. 5A to 5D illustrate a sequence of displays on a display region, in accordance with the first embodiment of the present invention.

A menu may be used to program the general disposition instructions and exceptions, such as those shown in FIGS. 4A and 4B. FIG. 5A shows a first menu 502 that may be retrieved using the key panel 228 on the display screen 222. As shown in FIG. 5a, the menu 502 includes five personas (01 Work, 02 home, 03 Coach, 04 Boy Scout Leader, 05 Volunteer). The persona "01 work", for example, is displayed within a selecting region 503 of the menu screen display 502 is selected for the purpose of updating, addition or deletion.

Figure 5B:
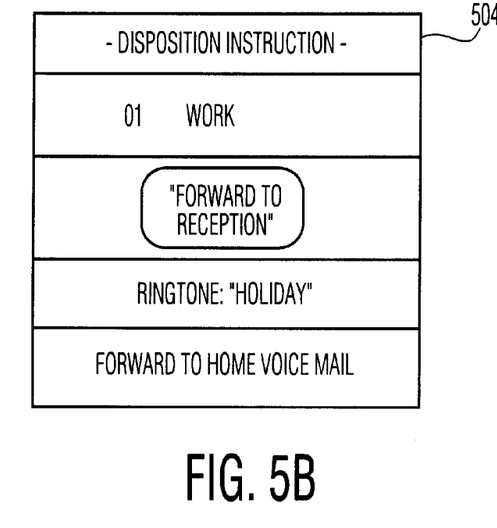

FIG. 5B shows a sub-menu 504 presented on the display screen 222, in response to selecting the "01 work" region 503 of the first menu screen display 502. Upon selection of "01 work", the general disposition instruction associated with the subscriber identity "01 work" is retrieved from the directory number and general disposition memory 312, namely "Forward to reception" as shown in FIG. 4A. The menu selection that corresponds to the instruction currently stored in memory 312 is highlighted and displayed as shown in FIG. 5B. A number of other general disposition instructions in the menu are also visible in FIG. 5B. The user may scroll through the bottom portion of the menu of FIG. 5B and select other general disposition instructions applicable to the "work" persona. If another instruction is selected, it is stored in the directory number and general disposition memory 312 and displayed as a current selection on the screen display 504, for example, "Forward incoming call to home voice mail".

Figure 5C:
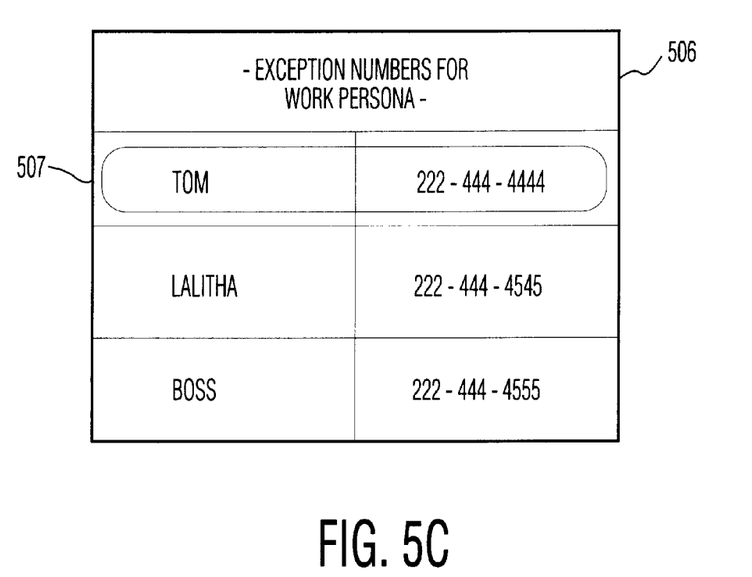
Figure 5D:
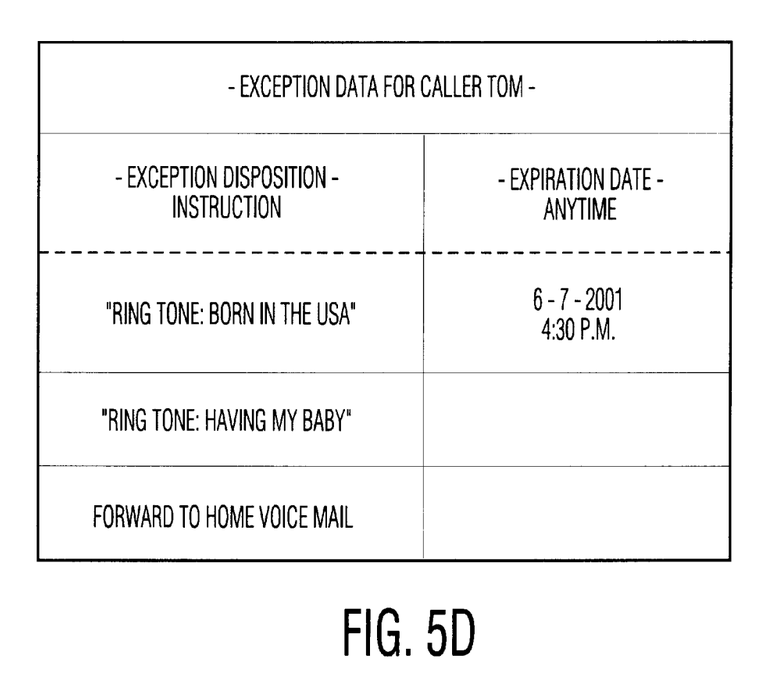

FIG. 5C shows another menu 506 on the display screen 222 that may be retrieved using the key panel 228. As shown in FIG. 5C, the menu 506 displays the three exception numbers stored for the "work" persona stored in the exception number and exception disposition memory 314 of FIG. 4B. By selecting a caller/exception number pair, for example caller "Tom" and exception number "222-444-4444", the processor 304 retrieves the exception disposition instruction and expiration date and time for the exception number "222-444-4444" from the exception number and exception disposition memory 314, namely "Ring Tune: Born in the USA" and "Jun. 7, 2001, 4:30 pm" as shown in FIG. 4B. A menu selection that corresponds to the exception disposition instruction currently stored in memory 314 is highlighted and displayed as shown in the left-hand portion of FIG. 5D. The user may scroll through the left-hand portion of the menu of FIG. 5D for other exception disposition instructions applicable to the "work" persona. (A number of the other exception disposition instructions are visible in FIG. 5D). If another exception instruction is selected, it is stored for "Tom" in the exception number and exception disposition memory 314. Similarly, the user may input another expiration date and time using the keypad 228 or eliminate the expiration date and time, thus updating the exception record for "Tom" in the memory 314.

Directory identities and exception data thus may be updated, deleted or added to the memory 308 of the mobile device 120 at the discretion of the user. The user will also be prompted to input data and profiles for identities specific profiles for call associated services (e.g., call forwarding to work voice mail), based on user selected parameters.

Figure 6:
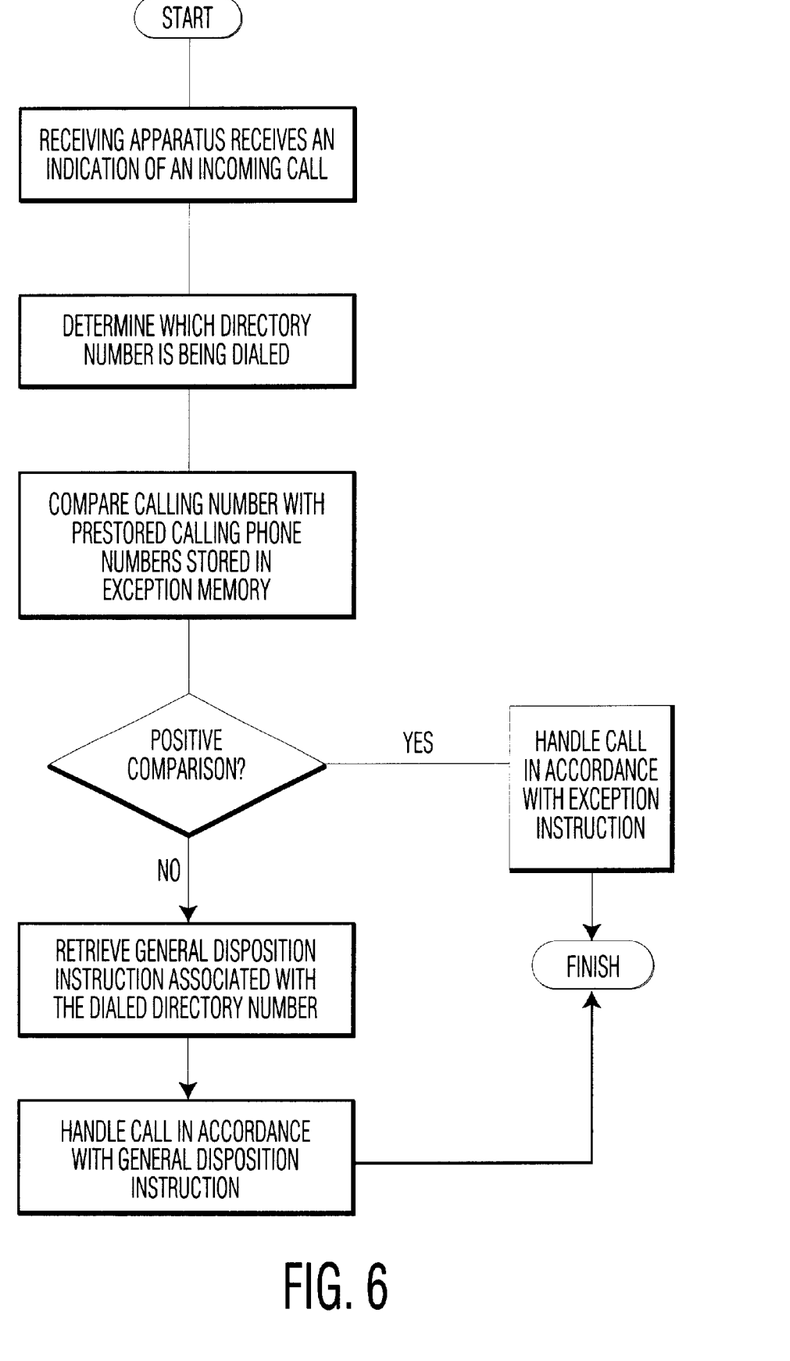
FIG. 6 shows a flowchart illustrating the steps of processing an incoming call.

FIG. 6 is a flow chart describing the operation of the wireless communication unit 120 in accordance with one embodiment of the present invention. The flowchart generally describes how the wireless communication unit 120 processes an incoming call. The method begins at step 601.

At step 602, the wireless communication unit 120 receives an indication of an incoming call. At step 603, a determination is made regarding which directory number has been dialed. At step 604, the wireless communication unit 120 compares the caller number (i.e., the telephone number from which the incoming call originates) with the pre-stored exception numbers for the dialed directory number in the exception number and exception disposition memory. If there is a match between the calling number and an exception number at step 605, the call is handled in accordance with the exception disposition instruction for the corresponding exception number at step 606. Otherwise, if the determination is negative at step 608 the associated general disposition instruction for the dialed directory number is retrieved from the directory number and general disposition memory. At step 610, the general disposition instruction is executed for the dialed directory number.

Figure 7:
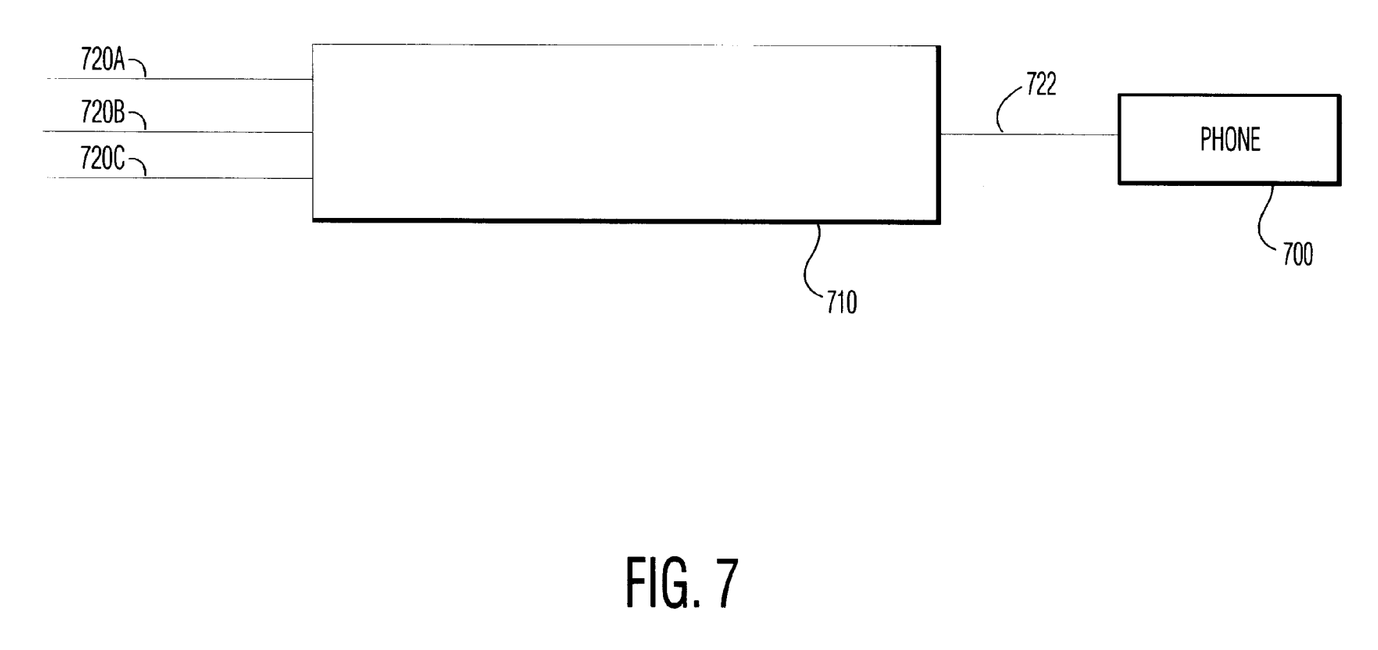
FIG. 7 is a representative diagram of a second embodiment of the present invention.

FIG. 7 shows an alternative embodiment of the invention, where the communication unit is comprised of a server 710 and a wired telephone set 700 located, for example, in a home. Server or control unit 710 receives three separate telephone lines 720a, 720b, 720c that each support a separate telephone number. Server 710 is connected to telephone set 700 by communication line 722. Server 710 incorporates analogous processing and memory components as those depicted for the cellular embodiment shown in FIGS. 3–6 and described above. The directory numbers in this embodiment are the three separate telephone numbers supported by lines 720a, 720b, 720c. Thus an incoming call from a calling number to one of the directory numbers received over one of lines 720a, 720b, 720c is processed by server 710 in the analogous manner described above for the cellular embodiment, resulting in the call being processed according to either an appropriate general disposition instruction or an appropriate exception instruction. The server 710 and the telephone set 700 may be an integrated unit. Other equivalent configurations are also possible.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A method of responding to calls received by a communication unit that receives calls via two or more directory numbers, the method comprising the steps of:
    a) receiving from a caller a call over one of said two or more directory numbers;
    b) identifying the one of the two or more directory numbers over which the call is received;
    c) identifying the calling number from which the call is placed;
    d) determining whether the call from the identified calling number to the identified one directory number is subject to an exception disposition instruction;
    e) where it is determined that the identified calling number to the identified one directory number is not subject to an exception disposition instruction in step d, responding to the call by performing a general disposition instruction for the identified one directory number; and
    f) where it is determined that the identified calling number to the identified one directory number is subject to an exception disposition instruction in step d, responding to the call by performing the exception disposition instruction.

2. The method of claim 1, wherein the general disposition instruction is one selected from the group of a call forwarding instruction and an instruction to use a particular ring tone when connecting the call.

3. The method of claim 1, wherein the communication unit is one selected from the group of a cellular telephone, a pager, a pda device, a server and a wired telephone.

4. The method of claim 1, wherein the step of identifying the calling number from which the call is placed includes determining the calling number using caller ID data.

5. The method of claim 1, wherein the step of determining whether the call from the identified calling number to the identified one directory number is subject to an exception disposition instruction comprises consulting a memory comprising exception disposition instructions each associated with one of the directory numbers and an exception number.

6. The method of claim 5, wherein the step of determining whether the call from the identified calling number to the identified one directory number is subject to an exception disposition instruction comprises consulting the memory to determine whether an exception disposition instruction is associated in the memory with an exception number corresponding to the identified calling number and the identified one directory number.

7. The method of claim 1, wherein the step of responding to the call by performing a general disposition instruction for the identified one directory number in step e comprises consulting a memory to determine a general disposition instruction associated with the identified one directory number.

8. A communication unit responsive to a call from a caller at a calling number and received via one of two or more directory numbers, the communication unit comprising a processor, the processor a) identifying the one of the two or more directory numbers over which the call is received, b) identifying the calling number from which the call is placed and c) determining whether the call from the identified calling number to the identified one directory number is subject to an exception disposition instruction, wherein where the processor determines that the identified calling number to the identified one directory number is not subject to an exception disposition instruction, the processor responds to the call by initiating a general disposition instruction for the identified one directory number and wherein where the processor determines that the identified calling number to the identified one directory number is subject to an exception disposition instruction, the processor responds to the call by performing the exception disposition instruction.

9. The communication unit of claim 8, wherein the communication unit is one selected from the group of a cellular telephone, a pager, a pda device, a server and a wired telephone.

10. The communication unit of claim 8, wherein the processor identifies the calling number from which the call is placed using caller ID data received with the call.

11. The communication unit of claim 8, wherein the processor determines whether the call from the identified calling number to the identified one directory number is subject to an exception disposition instruction by consulting a memory comprising exception disposition instructions each associated with one of the directory numbers and an exception number.

12. The communication unit of claim 11, wherein the processor determines whether the call from the identified calling number to the identified one directory number is subject to an exception disposition instruction by consulting the memory to determine whether an exception disposition instruction is associated in the memory with an exception number corresponding to the identified calling number and the identified one directory number.

13. The communication unit of claim 8, wherein responding to the call by performing a general disposition instruction for the identified one directory number by the processor comprises consulting a memory to determine a general disposition instruction associated with the identified one directory number.

* * * * *